United States Patent
Masumiya et al.

(10) Patent No.: US 10,599,124 B2
(45) Date of Patent: Mar. 24, 2020

(54) TOOL PATH GENERATING METHOD

(71) Applicant: MAKINO MILLING MACHINE CO., LTD., Tokyo (JP)

(72) Inventors: Yasunori Masumiya, Aiko-gun (JP); Kyohei Suzuki, Aiko-gun (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 0 days.

(21) Appl. No.: 15/775,176

(22) PCT Filed: Nov. 16, 2015

(86) PCT No.: PCT/JP2015/082151
§ 371 (c)(1),
(2) Date: May 10, 2018

(87) PCT Pub. No.: WO2017/085768
PCT Pub. Date: May 26, 2017

(65) Prior Publication Data
US 2018/0307197 A1    Oct. 25, 2018

(51) Int. Cl.
*G05B 19/19* (2006.01)
*G05B 19/401* (2006.01)

(52) U.S. Cl.
CPC .......... *G05B 19/19* (2013.01); *G05B 19/401* (2013.01); *G05B 2219/35151* (2013.01);
(Continued)

(58) Field of Classification Search
CPC .. G05B 19/19; G05B 19/401; G05B 19/4093; G05B 2219/37576; G05B 2219/50057;
(Continued)

(56) References Cited

U.S. PATENT DOCUMENTS

| 6,046,860 | A | 4/2000 | Hirata et al. |
| 2014/0257542 | A1* | 9/2014 | Li .................. G05B 19/404 700/97 |
| 2018/0039251 | A1* | 2/2018 | Sato .................. B23C 3/12 |

FOREIGN PATENT DOCUMENTS

| JP | 9-159914 | 6/1997 |
| JP | 10-240322 | 9/1998 |

(Continued)

OTHER PUBLICATIONS

Annular surfaces in annular field systems. Article. [online]. Jose M. Sasian. [retrieved from internet on Jun. 10, 2019]. (Year: 1997).*
(Continued)

*Primary Examiner* — Robert E Fennema
*Assistant Examiner* — Marzia T Monty
(74) *Attorney, Agent, or Firm* — Morrison & Foerster LLP

(57) ABSTRACT

A tool path generation method includes inputting a first function derived from a polynomial expression including a plurality of coefficients representing a first curved surface, generating a first tool path based on the first function, inputting the first tool path to an NC device of a machine tool and machining a workpiece by relative movement between a tool and a workpiece along the first tool path, measuring the shape of the workpiece at a plurality of measurement points on a surface of the machined workpiece, calculating, for each of the measurement points, a symmetrical position with respect to the first curved surface in a direction perpendicular to the first curved surface as a correction point, obtaining a second function representing a second curved surface based on a series of position data of the correction points, and generating a second tool path based on the second function.

3 Claims, 6 Drawing Sheets

(52) U.S. Cl.
CPC .............. *G05B 2219/35261* (2013.01); *G05B 2219/37576* (2013.01); *G05B 2219/45157* (2013.01); *G05B 2219/50057* (2013.01)

(58) Field of Classification Search
CPC ........... G05B 2219/45157; G05B 2219/35151; G05B 2219/35261
See application file for complete search history.

(56) References Cited

FOREIGN PATENT DOCUMENTS

| | | |
|---|---|---|
| JP | 2010-146176 | 7/2010 |
| JP | 2012-88601 | 5/2012 |

OTHER PUBLICATIONS

Huang, H. (Jul. 2007). "Profile Error Compensation Approaches for Parallel Nanogrinding of Aspherical Mould Inserts," International Journal of Machine Tools and Manufacture Design, Research and Application 47(15): 2237-2245.

* cited by examiner

TOOL PATH GENERATING METHOD

CROSS REFERENCE TO RELATED APPLICATION

This application is a U.S. National phase patent application of International Patent Application No. PCT/JP2015/082151, filed Nov. 16, 2015, the contents of which are hereby incorporated by reference in the present disclosure in its entirety.

FIELD OF THE INVENTION

The present invention relates to a method for generating a tool path which is supplied to an NC device of a machine tool for machining a workpiece by relatively moving a tool and the workpiece.

BACKGROUND OF THE INVENTION

Patent Literature 1 discloses a method for the production of a lens for an optical scanning device used for a laser beam printer, a digital copying machine, or the like, the method comprising the steps of forming the lens by injection molding, measuring the shape of the surface of the molded lens, calculating shape errors by subtracting a design value (design shape) from a measured value (measured shape data), inverting the sign of the calculated shape error and superimposing it on the prior design shape as a correction amount, and producing a die for molding the lens.

PATENT LITERATURE

[Patent Literature 1] JP-A-2012-88601

BRIEF SUMMARY OF THE INVENTION

By inverting the sign of the calculated shape error and superimposing it on the prior design shape, correction can be made to a certain extent, as in the invention described in Patent Literature 1. However, correcting according to shape characteristics is difficult. In this correction method, there is a problem that the correction is sensitive to measurement noise, whereby an appropriate tool path cannot be generated. The present invention aims to solve such problem of the prior art as a technical problem and is aimed to provide a tool path generation method which makes it possible to further satisfactorily correct the tool path so as to reduce shape errors while maintaining the characteristics of the function representing the curved surface.

In order to solve the problem described above, there is provided a tool path generation method for generating a tool path based on a function defining a curved surface in a three-dimensional space, the method comprising the steps of inputting a first function derived from a polynomial expression including a plurality of coefficients representing a first curved surface, generating a first tool path based on the first function, inputting the first tool path to an NC device of a machine tool and machining a workpiece by relative movement between a tool and a workpiece along the first tool path, measuring the shape of the workpiece at a plurality of measurement points on a surface of the machined workpiece, calculating, for each of the measurement points, a symmetrical position with respect to the first curved surface in a direction perpendicular to the first curved surface as a correction point, obtaining a second function representing a second curved surface based on a series of position data of the correction points and generating a second tool path based on the second function.

According to the present invention, by calculating, for each of the measurement points, positions symmetrical to the first curved surface in a direction perpendicular to the first curved surface as correction points, obtaining a second function representing a second curved surface which is most applicable to a series of position data of the correction points, and generating a second tool path based on the second function, it is possible to make a correction that conforms to the shape characteristics of the first curved surface.

DETAILED DESCRIPTION OF THE INVENTION

Preferable embodiments of the present invention will be described below with reference to the attached drawings.

Figure 1:
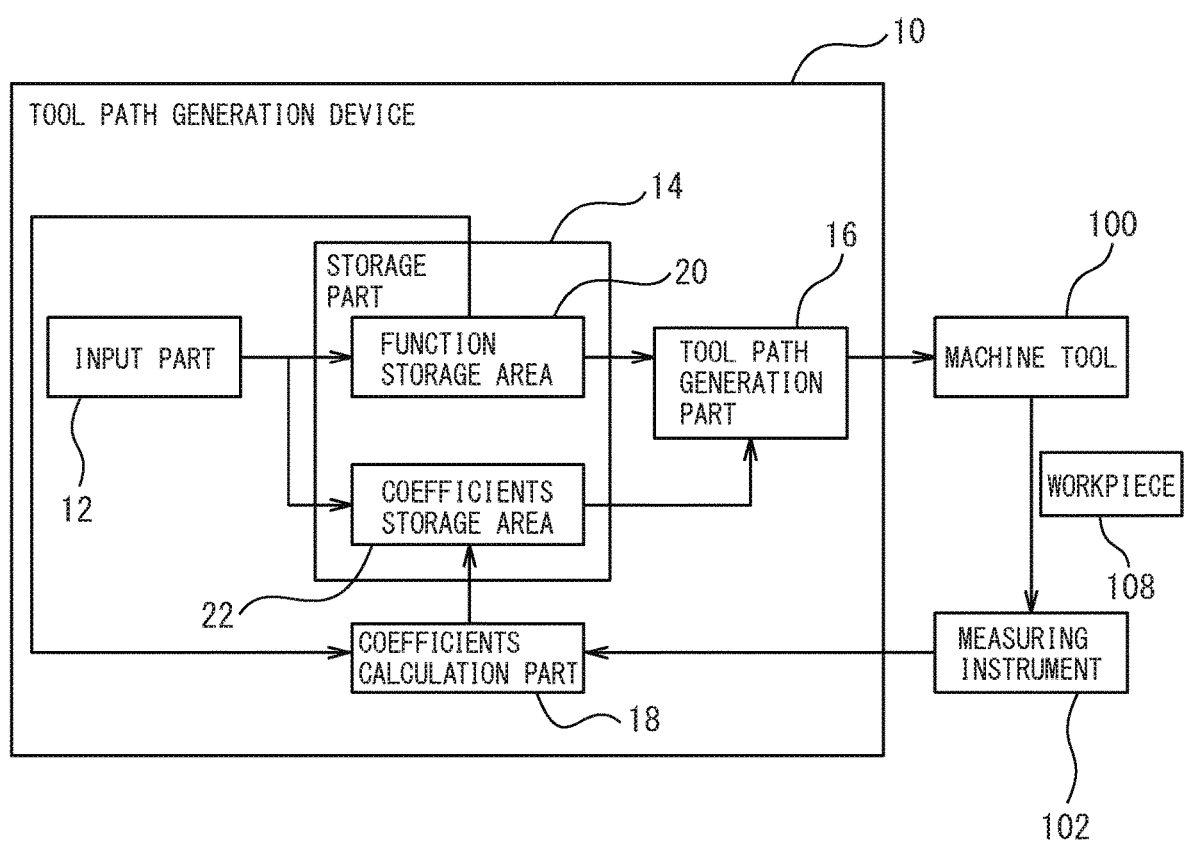
FIG. 1 is a schematic block diagram of a tool path generation device which executes the tool path generation method of the present invention.
Figure 2:
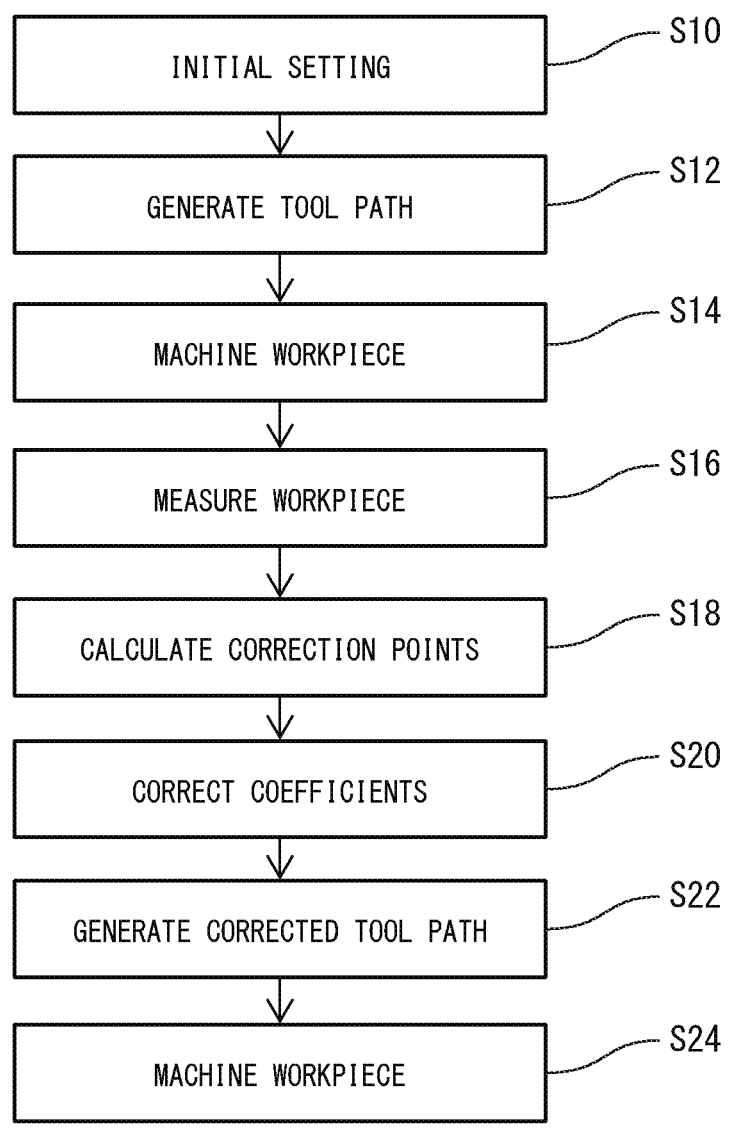
FIG. 2 is a flowchart showing the tool path generation method of the present invention.
Figure 3:
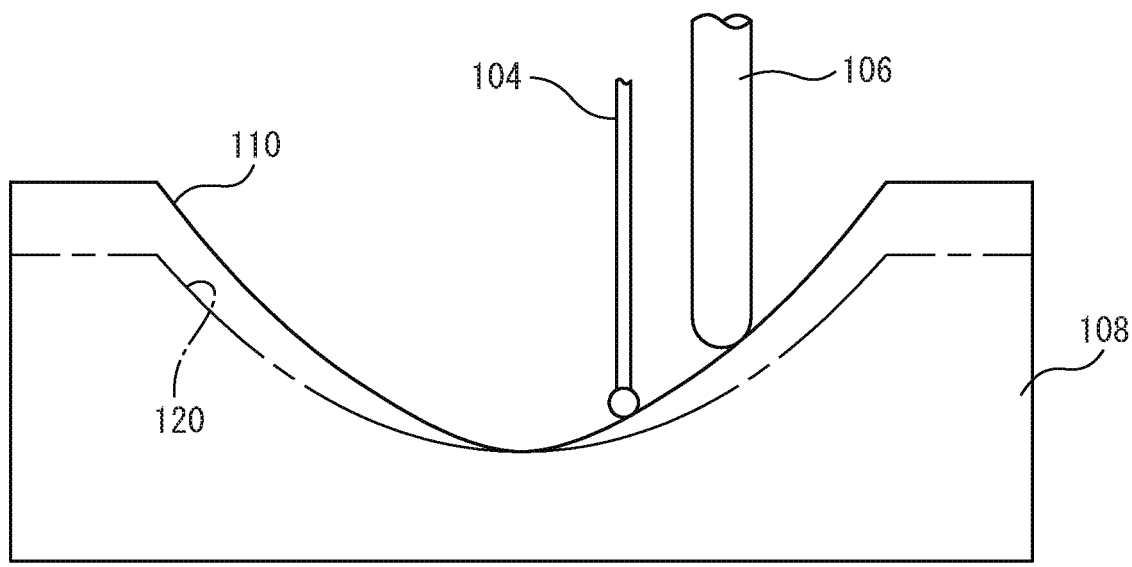
FIG. 3 is a schematic view detailing the tool path generation method of the present invention.

In FIG. 1, a tool path generation device 10 includes, as main components, an input part 12, a storage part 14, a tool path generation part 16, and a coefficients calculation part 18. The tool path generated by the tool path generation part 16 is output to a machine tool 100.

The machine tool 100 may be, for example, a machining center which includes a processing machine, such as a milling machine, having a rotatably supported spindle (not shown), a table (not shown) on which a workpiece 108 is attached so as to face the spindle, and a feed device (not shown) for moving the spindle and/or the workpiece 108 relative to each other in at least the X, Y, and Z orthogonal triaxial directions, and an NC device for controlling the tool feeding of the processing machine. The processing machine may be a lathe in which the workpiece 108 is attached to the rotatably supported spindle and a tool is attached a tool post (not shown), wherein the feed device which causes the relative movement of the tool post in the X, Y, and Z orthogonal triaxial directions is controlled by an NC device. Furthermore, the machine tool 100 includes a measuring instrument 102 for measuring the machined surface of the machined workpiece W. The measurement results produced by the measuring instrument 102 are transmitted to a coefficients calculation part 18.

The input part 12 may be a keyboard, a touch panel or the like using which mathematical expressions and numerical values may be input to the storage part 14. The function obtained from the polynomial expression including a plurality of coefficients defining a surface formed on the workpiece 108 and various numerical values of the plurality of coefficients are input to the storage part 14 via the input part 12. The storage part 14 may be a flash memory or a hard drive and includes at least a function storage area 20 for storing the aforementioned function and numerical values input from the input part 12, and a coefficients storage area 22.

The tool path generation part 16 generates a tool path or NC data based on the function and the numerical values of the coefficients of the function stored in the storage part 14 and transmits the tool path stored in the storage part 14 or NC data to the NC device of the machine tool 100 at predetermined time intervals. The machine tool 100 machines the workpiece by moving the tool relative to the workpiece along the tool path transmitted to the NC device.

The tool path generation method of the present invention will be described in detail below with reference to the flowchart shown in FIG. 2 and FIGS. 3 to 7.

First, a first function and numerical values of the coefficients of the first function are input to the storage part 14 via the input part 12 and initial setting is performed (step S10). The first function may be set as a polynomial expression including a plurality of coefficients defining a curved surface which to be formed on the workpiece 108. In the present embodiment, the workpiece 108 is a die for molding an aspherical lens and the first function is a polynomial expression defining the aspherical surface of the lens. More specifically, the first function is generally represented by Formula (1) below.

[Formula 1]

$$z(h) = \frac{ch^2}{1 + \sqrt{1 - (1+K)c^2 h^2}} + Ah^4 + Bh^6 + Ch^8 + Dh^{10} \quad (1)$$

In Formula (1) above, z(h) is the sag amount, which is the displacement of the surface in the optical axis direction from the vertex (h=0) at the distance (radial direction) h from the optical axis. C is the curvature and K is the conic constant. A through D are aspherical coefficients which are input from the input part 12 in the initial setting of step S10. Further, the aspherical coefficients A through D are calculated and modified by the coefficients calculation part 18, as described later.

When initial setting has finished, the tool path generation part 16 generates a tool path or machining data based on the input function, Formula (1) of the present impediment, and the numerical values of the aspherical coefficients (A through D) (step S12). The obtained tool path or machining data is output to the NC device of the machine tool 100 at predetermined time intervals, and the machine tool 100 machines the workpiece 108 (step S14). In the example shown in FIGS. 3 to 5, the machine tool 100 is a machining center including a ball end mill 106 as a tool attached to the tip of the spindle. Furthermore, in the example shown in FIGS. 3 to 5, the central axis direction of the ball end mill 106 is defined as the Z axis and the directions perpendicular to the Z axis are defined as the X axis and Y axis.

When machining has finished, the machined surface 110 (FIGS. 3 and 4) is measured by the measuring instrument 102 (step S16). In the example shown in FIGS. 3 and 4, the measuring instrument 102 can include a touch sensor having a probe 104 which may be mounted on the end of the spindle of the machine tool 100. In such a case, when the tip of the probe 104 contacts the surface of the workpiece 108, a skip signal is generated from the measuring instrument 102, and the X axis, Y axis and Z axis coordinates of the feed device of the machine tool 100 can be output to the coefficients calculation part 18 with the skip signal as a trigger.

Figure 4:
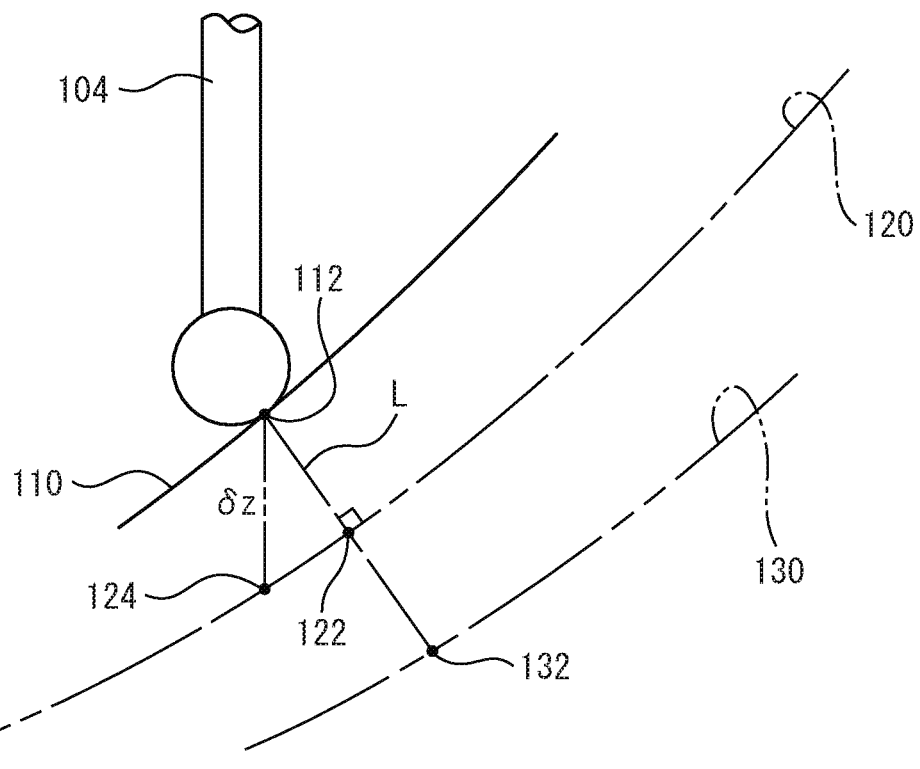
FIG. 4 is a schematic view showing a machined surface, a design surface (first curved surface), and a corrected curved surface (second curved surface).
Figure 5:
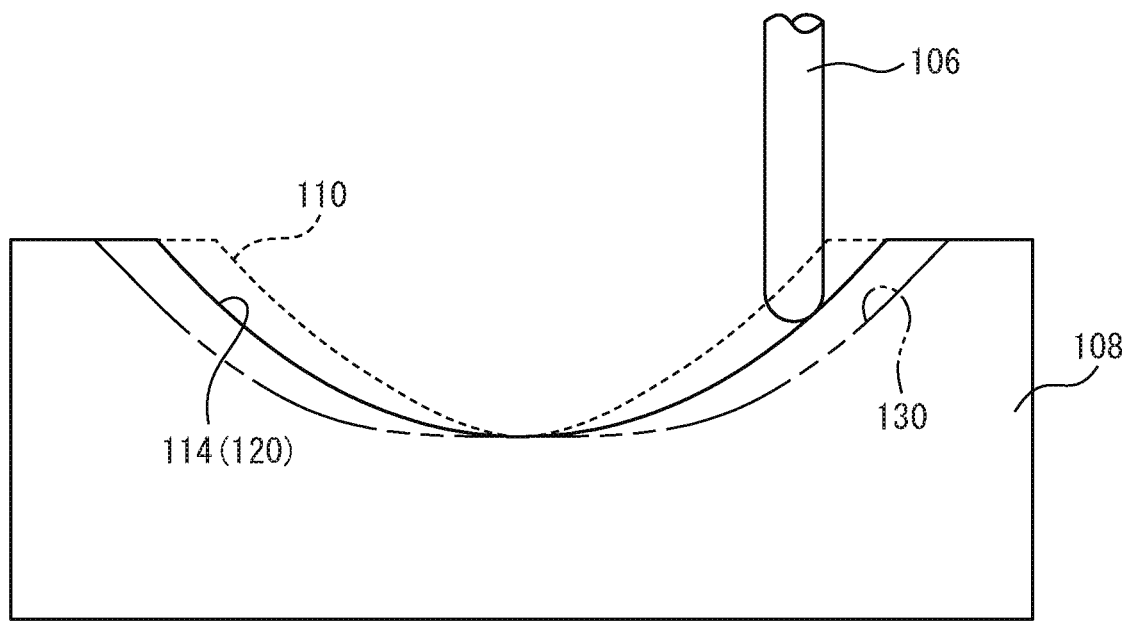
FIG. 5 is a schematic view detailing the tool path generation method of the present application.

The machined surface 110 is measured at a plurality of measurement points therealong and the X, Y, and Z coordinates of each measurement point are output to the coefficients calculation part 18. In the case where the workpiece 108 is a die for molding an aspherical lens, the design surface 120 is an aspherical surface represented by Formula (1) and the optical axis of the formed lens is parallel to the Z axis. The machined surface 110 does not completely coincide with the design surface 120 and includes an error δz that is a difference in the Z axis direction between the measurement points 112 on the machined surface 110 and the design surface 120. In FIG. 4, δz is a positive value indicating that cutting was insufficient, but δz may be a negative value indicating that excessive cutting has been performed.

When measurement of the workpiece 108 has finished, for each of the measurement points 112, the coordinates of points symmetrical to the design surface 120 are calculated and set as correction points 132, as shown in FIG. 4 (step S18). More specifically, first, a straight line L passing through the measurement point 112 and perpendicular to the design surface 120 is calculated. The point 112 in FIG. 4 is the base of the normal L to the design surface 120 extending from the measurement point 112. Next, the coordinate of the symmetrical point 132 symmetrical to the measurement point 112 with respect to the design surface 120 on the straight line L is calculated. In the present invention, the point 132 symmetrical to the measurement point 112 is referred to as a correction point.

Next, a virtual curved surface (second curved surface) that best fits the coordinate data group of the series of correction points 132 is determined. In the present embodiment, the second curved surface, which is the virtual curved surface, is defined by a function similar to Formula (1) obtained by correcting the aspherical coefficients A to D of Formula (1) by the coefficients calculation part 18 based on the coordinate data group of the measurement points 112 measured by the measuring instrument 102, as described below (step S20). Formula (1) in which the aspherical coefficients A to D have been corrected becomes the second function. Next, the tool path generation part 16 generates a second tool path based on the function stored in the function storage area 20 and the corrected aspherical coefficients A to D calculated by the coefficients calculation part 18 and stored in the coefficients storage area 22, i.e., based on the second function (step S22). The machine tool 11 machines the workpiece 108 along the second tool path (step S24).

The method for obtaining the second function will be specifically described below with reference to FIGS. 6 and 7.

In general, if function f converts point p from in the parameter space to point q in three-dimensional space, the relationship between p and q is represented by the following Formula (2).

[Formula 2]

$$\vec{q} = f(\vec{p}) = \begin{bmatrix} f_x(\vec{p}) \\ f_y(\vec{p}) \\ f_z(\vec{p}) \end{bmatrix} \quad (2)$$

where,

[Formula 3]

$$\vec{p} = \begin{bmatrix} u \\ v \end{bmatrix},$$

[Formula 4]

$$\vec{q} = \begin{bmatrix} x \\ y \\ z \end{bmatrix},$$

u and v represent a point in parameter space, and x, y, and z represent a point in three-dimensional space corresponding to u and v.

Next, the coefficients for correction are introduced into function f. It is necessary that the coefficients sufficiently define the correction amounts. In the following formulae, F is the function into which the coefficients for correction are introduced, "a" is the coefficient vector for correction, and N is the degree of the coefficient vector.

[Formula 5]

$$\vec{q} = F(\vec{p}, \vec{a}) = \begin{bmatrix} F_x(\vec{p}, \vec{a}) \\ F_y(\vec{p}, \vec{a}) \\ F_z(\vec{p}, \vec{a}) \end{bmatrix}$$

[Formula 6]

$$\vec{a} = \begin{bmatrix} a_1 \\ a_2 \\ \vdots \\ a_N \end{bmatrix}$$

As shown in Formula (1), the formula expressing the shape of the optical components, such as a lens, already includes the aspherical coefficients A to D for correcting optical characteristics. In that case, the aspherical coefficients A to D can be used as the coefficients $a_1$ to $a_N$ for correction. Such a case can be compensated for by replacing the coefficient vector "a" subsequent thereto with a difference of each of aspherical coefficients A to D from the designated value. Machining of the workpiece 108 in step S14 is machining of the curved surface when coefficient vector "a" is a zero vector. When the coefficient vector "a" is a zero vector, function f and function F are equal.

$$f(\vec{p}) = F(\vec{p}, \vec{0}) \qquad \text{[Formula 7]}$$

The measurement points 112 are acquired as a point group in three-dimensional space. If the group including the series of measurement points 112 is r and the number of measurement points 112 is M, then:

[Formula 8]

$$\vec{r}_i = \begin{bmatrix} r_{i_x} \\ r_{i_y} \\ r_{i_z} \end{bmatrix}$$

$(i:1 \sim M)$

The group r of measurement points 112, which is a collection of points in three-dimensional space, are converted to points consisting of points in the parameter space (u-v space) and signed distances. The signed distance is a real number representing the distance from the point in three-dimensional space corresponding to the point in the parameter space (u-v space), wherein the distance in the normal direction is positive and the distance in the direction opposite to the normal direction is negative.

This conversion can be processed by, for example, the following.

First, points are generated in a lattice in the parameter space (u-v space) representing the design surface or the first curved surface (process I). Next, each point generated by process I is converted into a point in three-dimensional space and is correlated therewith (process II). At this time, a data structure such as a k-d tree (k-dimensional tree) with respect to the points in three-dimensional space converted by process II is generated. Thus, since a point close to the arbitrary point in the three-dimensional space can be searched at high speed, the subsequent processing can be processed at high speed. Since in this search the point is not necessarily the closest point, various approximate nearest neighbor search algorithms may be adopted.

Figure 6:
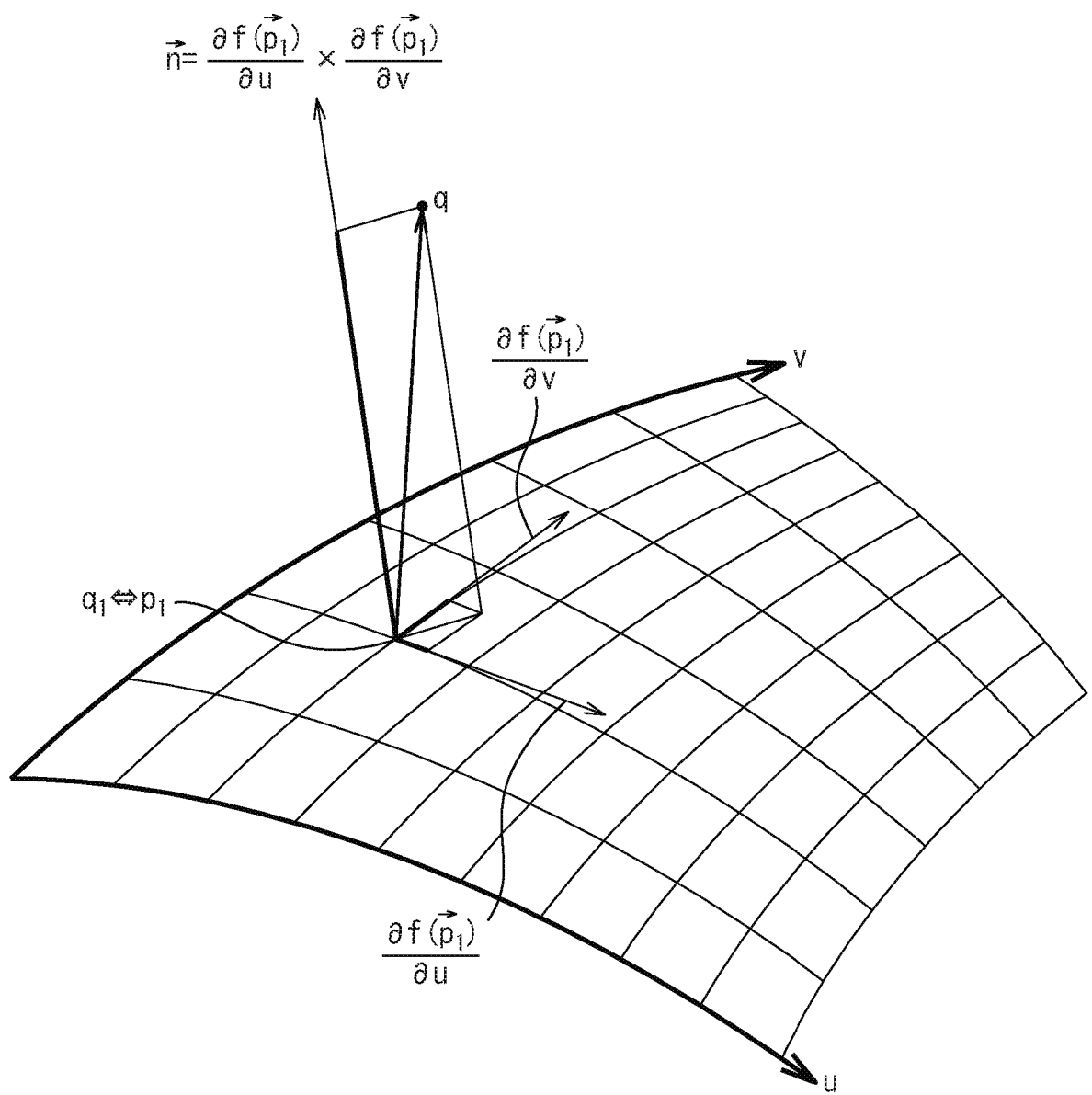
FIG. 6 is a schematic view detailing the method for obtaining the second function representing the second curved surface and showing the parameter space (u-v space) and measurement points.
Figure 7:
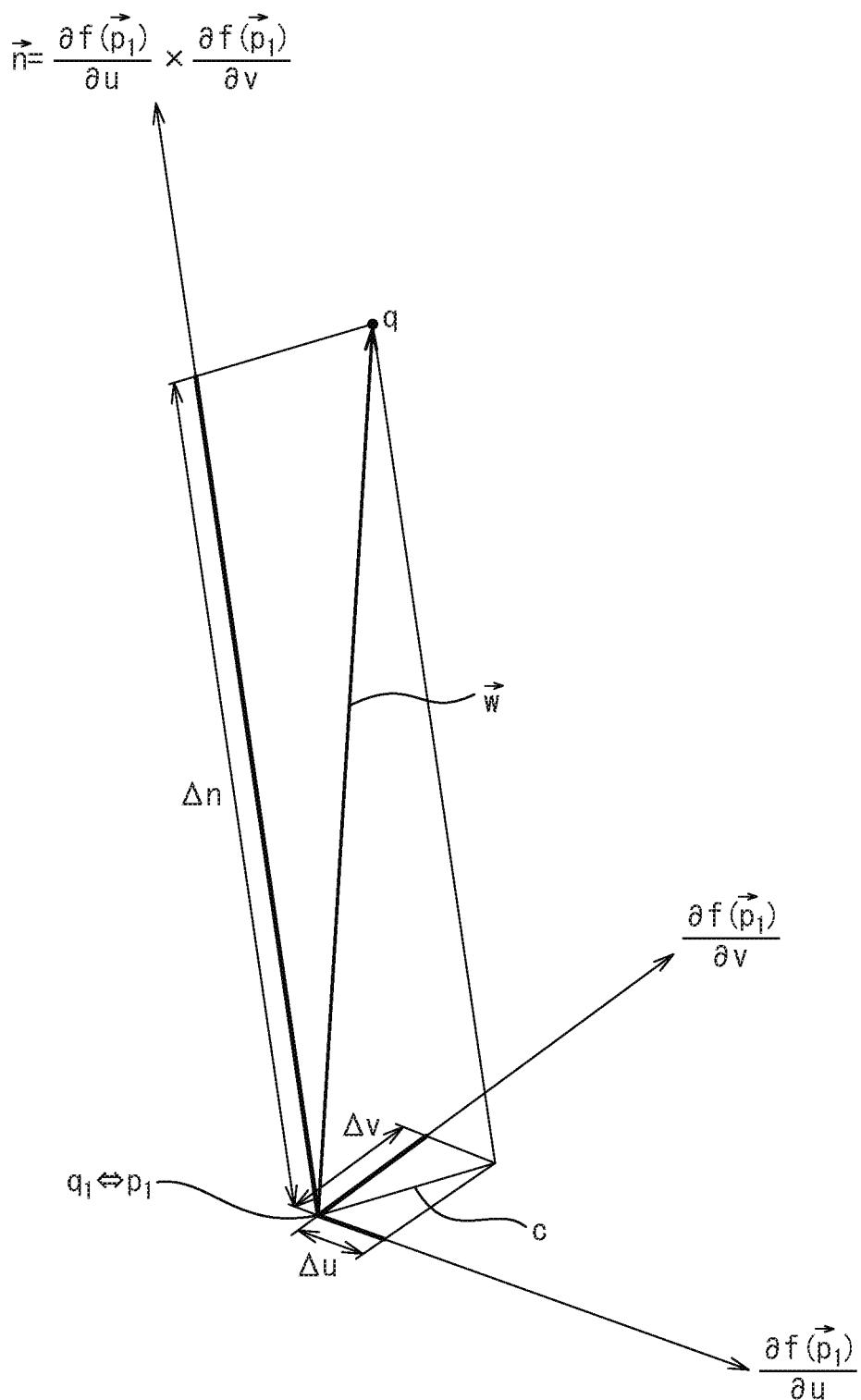
FIG. 7 is a partially enlarged view of FIG. 6.

Next, one of the measurement points 112 is set as a processing target point q (refer to FIGS. 6 and 7). A point closer to the target point q from among the points in three-dimensional space converted by the above process II is searched and set as $q_1$. Furthermore, the corresponding point in the parameter space (u-v space) is $p_1$. Namely, $$\vec{q}_1 = f(\vec{p}_1) \qquad \text{[Formula 9]}$$

Next, the following processing is performed for i=1 to infinity.

(Process 1) The u and v partial differentiations of the function f at the processing point $p_i$ are obtained and are set as $\partial f/\partial u$ and $\partial f/\partial v$, respectively.

(Process 2) The normal direction at point $p_i$ is calculated from $\partial f/\partial u$ and $\partial f/\partial v$. The normal vector is expressed by the following equation (4).

[Formula 10]

$$\vec{n}_i = \frac{\frac{\partial f}{\partial u}(\vec{p}_i) \times \frac{\partial f}{\partial v}(\vec{p}_i)}{l_u \cdot l_v} \qquad (4)$$

where:

[Formula 11]

$$l_u = \left| \frac{\partial f}{\partial u}(\vec{p}_i) \right|$$

and

[Formula 12]

$$l_v = \left| \frac{\partial f}{\partial v}(\vec{p}_i) \right|$$

(Process 3) The vector from $q_i$ toward q is divided into the ∂f/∂u direction, the ∂f/∂v direction, and the normal direction, which are set as Δu, Δv, and Δn, respectively.

Furthermore, Δu, Δv, and Δn are represented as follows.

[Formula 13]

$$\Delta u = \frac{c \cdot d_v - l_v \cdot d_u}{c^2 - l_u^2 \cdot l_v^2} \quad (5)$$

[Formula 14]

$$\Delta v = \frac{c \cdot d_u - l_v \cdot d_v}{c^2 - l_u^2 \cdot l_v^2} \quad (6)$$

[Formula 15]

$$\Delta n = \vec{w} \cdot \vec{n_i} \quad (7)$$

where,

[Formula 16]

$$c = \frac{\partial f}{\partial u}(\vec{p_i}) \cdot \frac{\partial f}{\partial v}(\vec{p_i}),$$

[Formula 17]

$$\vec{w} = \vec{q} - \vec{q_i};$$

[Formula 18]

$$d_u = \vec{w} \cdot \frac{\partial f}{\partial u}(\vec{p_i}),$$

and

[Formula 19]

$$d_v = \vec{w} \cdot \frac{\partial f}{\partial v}(\vec{p_i}).$$

Furthermore, "x" represents the outer product and "·" represents the inner product or multiplication.

(Process 4) When Δu and Δv are sufficiently small, the processes end. The coordinates of the converted points are ($p_{iu}$, $p_{iv}$, Δn).

(Process 5) $p_{(i+1)}$ represents $p_i$ having a u component and a v component to which Δu and Δu have been added respectively and $q_{(i+i)}$ represents $p_{(i+i)}$ which has been converted into points in three-dimensional space. Thereafter, the processing returns to (Process 1) and Process 1 to Process 4 are performed. Namely,

[Formula 20]

$$\vec{p_{i+1}} = \vec{p_i} + \begin{bmatrix} \Delta u \\ \Delta v \end{bmatrix}.$$

The measurement points 112 are converted into points in the parameter space and signed distances by the above processing. The converted point group is represented as R below.

[Formula 21]

$$\vec{R_i} = \begin{bmatrix} R_{i_u} \\ R_{i_v} \\ R_{i_w} \end{bmatrix}$$

where $I$ = 1 to $M$.

It is possible to cancel the error δz by determining the correction amount such that the correction points 132 are set so as to be symmetrical to the measurement points 112 with respect to the design surface 120 on the opposite side. The errors δz of the coordinate data of a series of measurement points 112 are calculated as the w component of the point group R after conversion. Namely, when the u and v coordinates of each point of the point group R are transformed by the function F, the coefficient vector "a" may be fit so that only the w component moves in the direction opposite to the normal direction, as compared with the case of conversion by function f. If the fitting process is considered as an optimization problem, it can be considered as a problem to minimize the following objective function E.

[Formula 22]

$$E(\vec{a}) = \sum_{i=1}^{M} \left| f\left(\begin{bmatrix} R_{i_u} \\ R_{i_v} \end{bmatrix}\right) - F\left(\begin{bmatrix} R_{i_u} \\ R_{i_v} \end{bmatrix}, \vec{a}\right) - \vec{n} \cdot R_{i_w} \right|^2 \quad (8)$$

Although n is a normal vector, the correction amount is normally a very small value, and the change in the normal direction due to the correction is often negligible in many cases. In that case, instead of calculating the normal direction each time, the normal direction can be stored as calculated by equation (4) and used for the calculation.

Since Equation (8) is a sum of squares minimization problem, it can be calculated by, for example, the Levenberg-Marquardt method. If the coefficient "a" that minimizes the function E is found, a corrected function (second function) can be obtained by substituting the coefficient "a" into function F.

REFERENCE SIGNS LIST

10 Tool Path Generation Device
12 Input Part
14 Storage Part
16 Tool Path Generation Part
18 Coefficients Calculation Part
20 Function Storage Area
22 Coefficients Storage Area
100 Machine Tool
102 Measuring Instrument
104 Probe
106 Ball End Mill
108 Workpiece
110 Machined Surface
112 Measurement Points
120 Design Surface
132 Correction Points

The invention claimed is:

1. A tool path generation method for generating a tool path based on a function defining a curved surface in a three-dimensional space, the method comprising the steps of:
    inputting a first function derived from a polynomial expression including a plurality of coefficients representing a first curved surface which is a surface to be formed on a workpiece,
    generating a first tool path for forming the first curved surface based on the first function;
    inputting the first tool path to a numerical control device of a machine tool and machining the workpiece by relative movement between a tool and the workpiece along the first tool path;

measuring a shape of the workpiece at a plurality of measurement points on a surface of the machined workpiece;

calculating, for each of the measurement points, a symmetrical position of said each of the measurement points with respect to the first curved surface in a direction perpendicular to the first curved surface as a correction point;

obtaining a second function representing a second curved surface based on a series of position data of the correction points by changing only the coefficients of the first function so as to fit the second curved surface to the series of position data of the correction points; and generating a second tool path for forming the second curved surface based on the second function.

2. The tool path generation method according to claim 1, wherein the second function is obtained based on the series of position data of the correction points using the method of least-squares.

3. The tool path generation method according to claim 1, wherein the first and second functions are expressed by the following formula:

$$z(h) = \frac{ch^2}{1 + \sqrt{1 - (1+K)c^2 h^2}} + Ah^4 + Bh^6 + Ch^8 + Dh^{10}.$$

* * * * *